United States Patent
Yang et al.

(10) Patent No.: US 8,610,391 B1
(45) Date of Patent: Dec. 17, 2013

(54) DISK DRIVE OPTIMIZING SPINDLE MOTOR TORQUE BY ADJUSTING LEADING PHASE ANGLE DURING SPIN-UP

(75) Inventors: Wenli Yang, Los Angeles, CA (US); Philip Tin Yue Ng, Anaheim, CA (US); Ashok K. Desai, Westlake Village, CA (US); Robert P. Ryan, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 169 days.

(21) Appl. No.: 13/172,719

(22) Filed: Jun. 29, 2011

(51) Int. Cl.
*H02K 21/00* (2006.01)
*H02K 23/00* (2006.01)

(52) U.S. Cl.
USPC ........ 318/437; 360/73.03; 310/68 B; 702/183

(58) Field of Classification Search
USPC .................. 318/437, 400.01–400.17, 400.2, 318/400.34, 400.39, 400.42, 254, 439, 430, 318/432, 599, 721
See application file for complete search history.

(56) References Cited

U.S. PATENT DOCUMENTS

| | | |
|---|---|---|
| 3,937,974 A | 2/1976 | Lafuze |
| 5,113,125 A | 5/1992 | Stacey |
| 5,798,623 A | 8/1998 | El-Sadi |
| 5,886,489 A | 3/1999 | Rowan et al. |
| 5,898,283 A | 4/1999 | Bennett |
| 5,915,861 A | 6/1999 | Wegmann et al. |
| 6,078,158 A | 6/2000 | Heeren et al. |
| 6,104,153 A | 8/2000 | Codilian et al. |
| 6,140,793 A | 10/2000 | Carr et al. |
| 6,198,590 B1 | 3/2001 | Codilian et al. |
| 6,236,174 B1 | 5/2001 | White |
| 6,252,362 B1* | 6/2001 | White et al. ............. 318/400.35 |
| 6,280,088 B1 | 8/2001 | Leuthold et al. |
| 6,534,936 B2* | 3/2003 | Messenger et al. ...... 318/400.35 |
| 6,577,088 B2 | 6/2003 | Heydt et al. |
| 6,825,622 B1* | 11/2004 | Ryan et al. .................. 318/400.2 |
| 6,943,523 B2 | 9/2005 | Feres |
| 6,946,808 B2 | 9/2005 | Kandori |
| 6,967,458 B1 | 11/2005 | Bennett et al. |
| 6,989,953 B1 | 1/2006 | Codilian |
| 7,026,781 B2 | 4/2006 | Yamazaki et al. |
| 7,071,640 B2 | 7/2006 | Kurosawa et al. |
| 7,253,582 B1 | 8/2007 | Ding et al. |
| 7,294,982 B2* | 11/2007 | Kurosawa et al. .......... 318/400.2 |
| 7,436,139 B2* | 10/2008 | Maslov et al. ................ 318/437 |
| 8,022,646 B1* | 9/2011 | Sutardja et al. ............... 318/268 |
| 8,054,022 B1* | 11/2011 | Ryan et al. ............... 318/400.34 |

(Continued)

OTHER PUBLICATIONS

George Pelz, "Designing Circuits for Disk Drives", Proceedings of the International Conference on Computer Design: VLSI in Computers & Processors, Sep. 23, 2001.

*Primary Examiner* — Lincoln Donovan
*Assistant Examiner* — Said Bouziane (57) ABSTRACT

A disk drive is disclosed comprising a head actuated over a disk, and a spindle motor for rotating the disk, the spindle motor comprising a plurality of windings. During a spin-up operation a sinusoidal driving voltage is applied to each winding of the spindle motor. A back electromotive force (BEMF) voltage generated by at least one of the windings is measured, and a rotation speed of the spindle motor is measured. The sinusoidal driving voltage is adjusted in order to optimize a lead angle relative to the rotation speed, wherein the lead angle represents a degree the sinusoidal driving voltage leads the BEMF voltage.

6 Claims, 6 Drawing Sheets

(56) References Cited

U.S. PATENT DOCUMENTS

2002/0190673 A1    12/2002    Brenden et al.
2006/0227448 A1*   10/2006    Kimura et al. ............. 360/73.03
2012/0293098 A1*   11/2012    Rote et al. ................ 318/400.14

* cited by examiner

$\alpha$ = Lead Angle
$\theta$ = Current Lag
$Vin = |Vin|\cos\alpha + j|Vin|\cos\alpha$
$Vbemf = K_e \cdot \omega$
$Vph = Vin - Vbemf$
$Iph = Vph/(Rw + j\omega_e L_w)$
$Td = real(Iph) \cdot K_t$

DISK DRIVE OPTIMIZING SPINDLE MOTOR TORQUE BY ADJUSTING LEADING PHASE ANGLE DURING SPIN-UP

BACKGROUND

Figure 1:
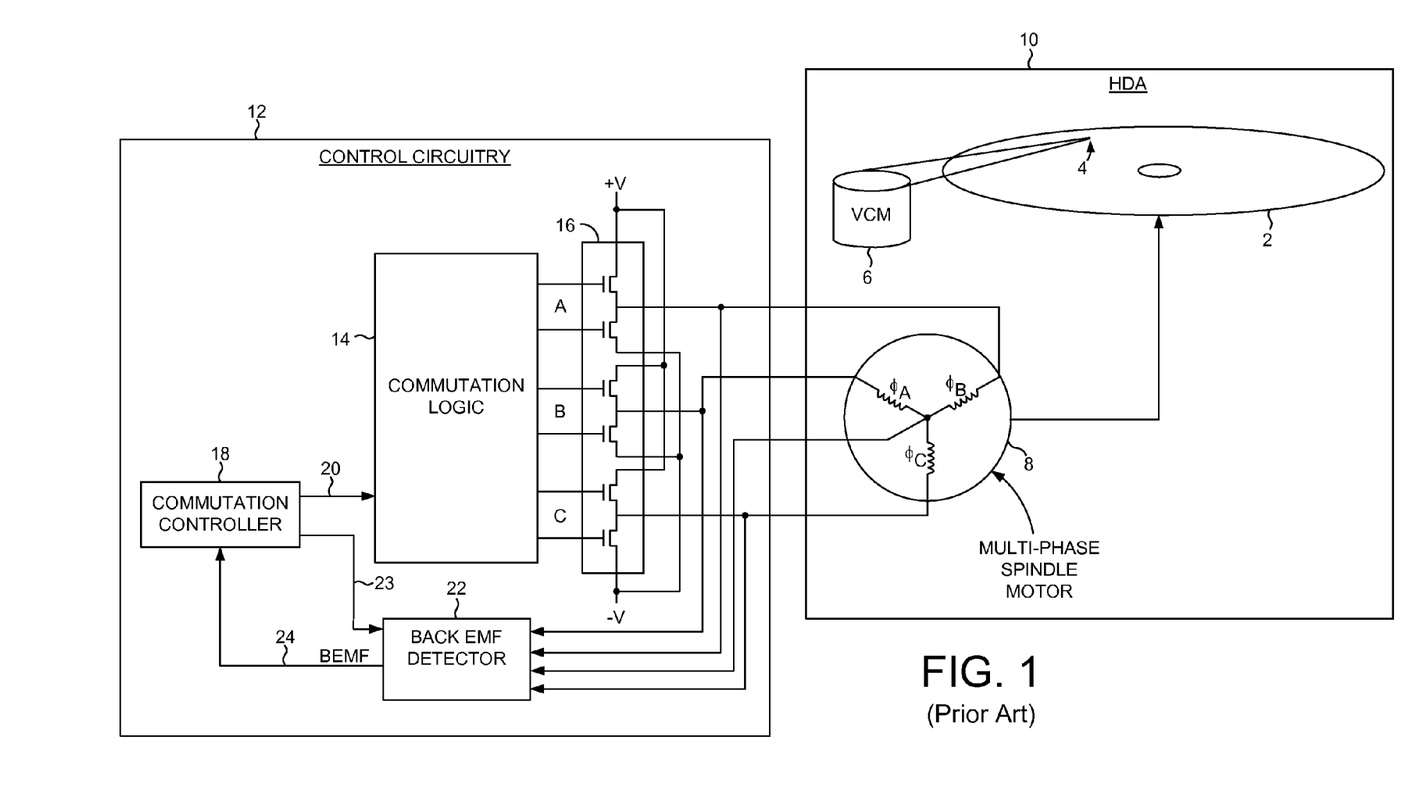
FIG. 1 shows a prior art disk drive comprising a head actuated over a disk, a spindle motor for rotating the disk, and a commutation controller for commutating the windings of the spindle motor.

FIG. 1 shows a prior art disk drive comprising a disk 2, a head 4 actuated over the disk 2 by a voice coil motor (VCM) 6, and a multi-phase spindle motor 8 for rotating the disk 2. The multi-phase spindle motor 8 comprises a plurality of windings (e.g., φA, φB, φC) which when energized with current generate a magnetic field that interacts with the magnetic field of permanent magnets (not shown) to generate a rotational torque. The disk 2, head 4, VCM 6, and spindle motor 8 are typically housed in a head disk assembly (HDA) 10, wherein control circuitry 12 mounted on a printed circuit board is typically attached to the HDA 10.

The control circuitry 12 commutates the windings of the spindle motor 8 over commutation intervals using any suitable commutation sequence. For example, commutation logic 14 may control switches 16 to commutate the windings of the spindle motor 8 in a two-phase, three-phase, or hybrid two-phase/three-phase commutation sequence. A commutation controller 18 applies a control signal 20 to the commutation logic 14 in order to transition between the commutation states.

The windings of the spindle motor 8 are connected to a back electromotive force (BEMF) detector 22 which detects threshold crossings (e.g., zero crossings) in the BEMF voltage generated by the windings with respect to the center tap. Since the BEMF voltage is distorted when current is flowing, the commutation controller 18 signals the BEMF detector 22 over line 23 when an "open" winding is generating a valid BEMF signal. At each BEMF threshold crossing the BEMF detector 22 toggles a signal to generate a square wave signal 24. The frequency of the BEMF threshold crossings and thus the frequency of the square wave signal 24 represent the speed of the spindle motor 8. The commutation controller 18 evaluates the square wave signal 24 and adjusts the control signal 20 in order to control the speed of the spindle motor 8.

Figure 2:
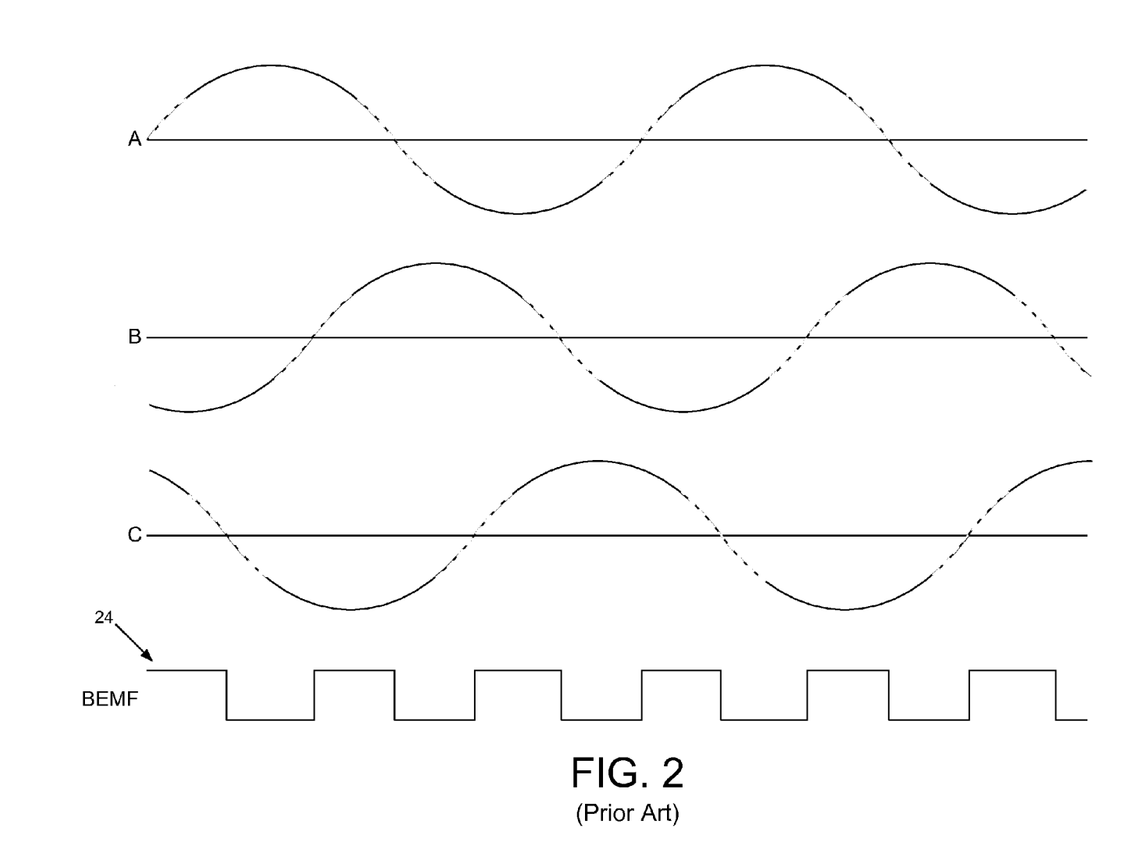
FIG. 2 shows prior art sinusoidal driving signals applied to the windings of the spindle motor, and a square wave representing zero crossings in a BEMF voltage generated by the windings.

The spindle motor 8 may be driven using any suitable driving signals, such as with square or trapezoidal waves, but the preferred driving signal is a sinusoidal wave. Example sinusoidal driving signals applied to the windings of the spindle motor 8 are shown in FIG. 2, wherein the frequency of the sinusoids is controlled closed loop in response to the BEMF signal 24. Each sinusoidal signal may be applied to a spindle motor winding using a linear amplifier, or each sinusoidal signal may modulate a PWM signal for driving the respective switches 16 shown in FIG. 1.

When the disk 2 is spun up after the disk drive is powered on or exits an idle mode, the commutation controller may generate the sinusoidal driving signal (voltage) with a lead phase angle relative to the BEMF voltage in order to accelerate the spindle motor with a corresponding torque. Prior art techniques have employed a constant lead phase angle during the spin-up process which can degrade the torque efficiency.

DETAILED DESCRIPTION OF EMBODIMENTS OF THE INVENTION

Figure 3:
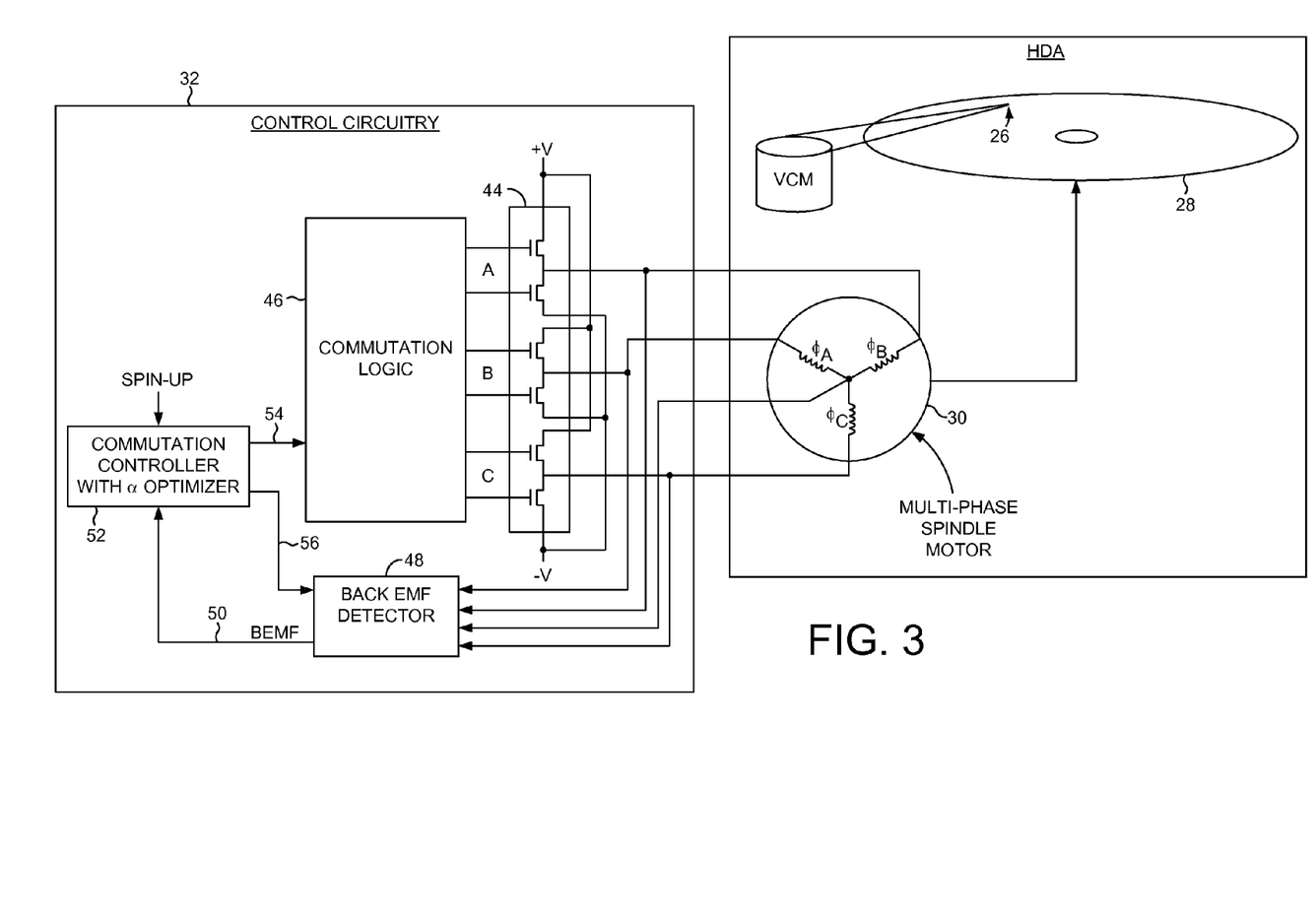
FIG. 3 shows a disk drive according to an embodiment of the present invention comprising a commutation controller that optimizes a lead angle between a sinusoidal driving voltage and the BEMF voltage.
Figure 4:
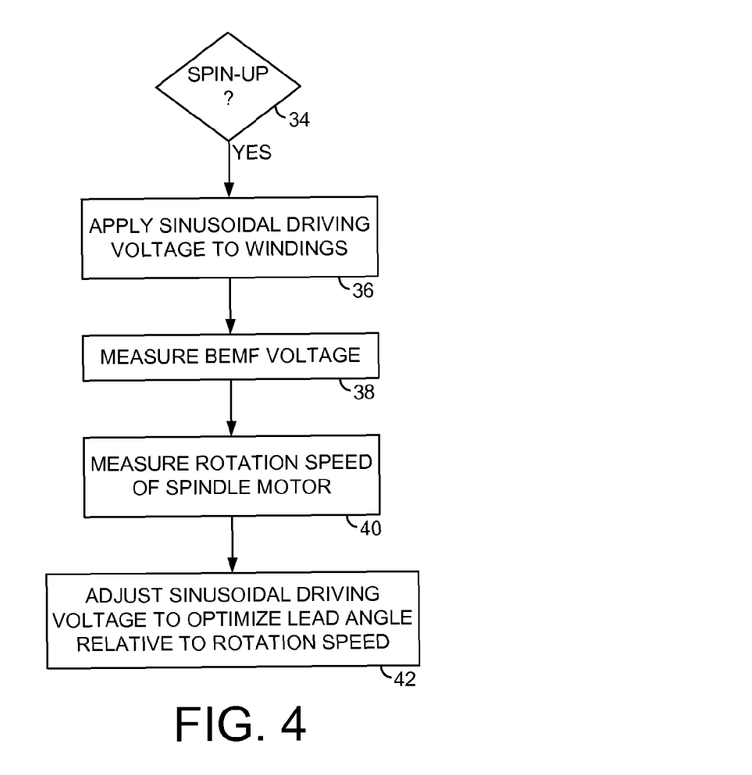
FIG. 4 is a flow diagram according to an embodiment of the present invention wherein the lead angle is adjusted relative to a rotation speed of the spindle motor.

FIG. 3 shows a disk drive according to an embodiment of the present invention comprising a head 26 actuated over a disk 28, and a spindle motor 30 for rotating the disk 28, the spindle motor 30 comprising a plurality of windings. The disk drive further comprises control circuitry 32 operable to execute the flow diagram of FIG. 4, wherein during a spin-up operation (step 34) a sinusoidal driving voltage is applied to each winding of the spindle motor (step 36). A back electromotive force (BEMF) voltage generated by at least one of the windings is measured (step 38), and a rotation speed of the spindle motor is measured (step 40). The sinusoidal driving voltage is adjusted in order to optimize a lead angle relative to the rotation speed (step 42), wherein the lead angle represents a degree the sinusoidal driving voltage leads the BEMF voltage.

Figure 5:
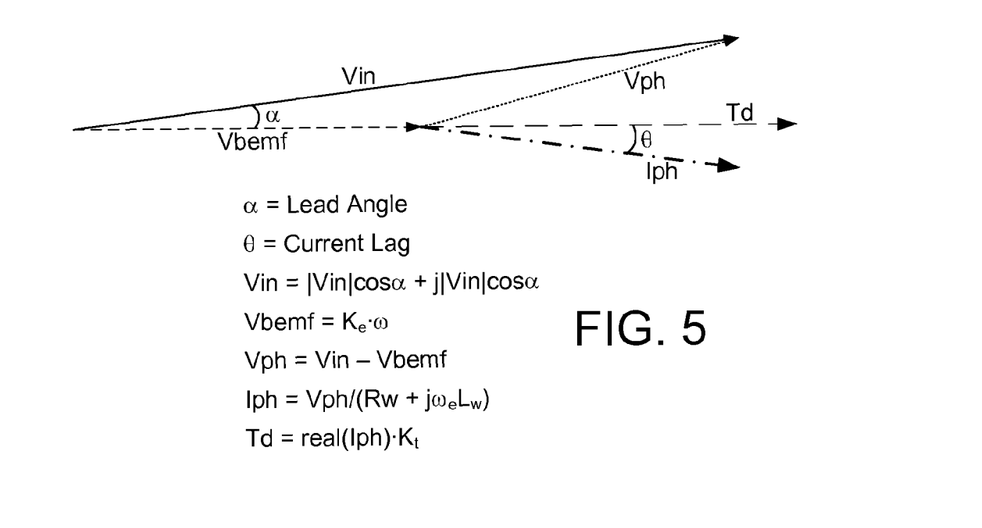
FIG. 5 illustrates the lead angle between the sinusoidal driving voltage represented as a vector and the BEMF voltage represented as a vector.

During the spin-up operation, the phase current in the windings of the spindle motor will increasingly lag the phase voltage of the windings as the rotation speed increases due to the inductance of the windings (FIG. 5 illustrates the lag angle representing the current lag in the windings). The lagging angle of the phase current reduces the power factor and weakens the developed torque of the spindle motor during the spin-up operation. This problem is exacerbated for disk drives having a high operating spin speed and/or when using a spindle motor having a high number of pole pairs. In the embodiments of the present invention, the lead angle that the sinusoidal driving angle leads the BEMF voltage is adjusted during the spin-up operation in order to adjust the lagging angle of the phase current, thereby optimizing the spindle motor torque during the spin-up operation.

FIG. 5 illustrates a number of vectors of the spindle motor representing the sinusoidal driving voltage (Vin), the BEMF voltage (Vbemf), the phase voltage for a particular winding (Vph), the corresponding phase current (Iph), and the resulting torque (Td). FIG. 5 also illustrates the lead angle that the sinusoidal driving voltage leads the BEMF voltage, and the lag angle that the phase current lags the BEMF voltage. The constants and variables of FIG. 5 are as follows:

ω represents the mechanical rotation speed of the spindle motor;

$\omega_e$ represents the electrical rotation speed of the spindle motor (ω×# pole pairs);

$K_e$ represent the spindle motor voltage constant;

$K_t$ represents the spindle motor torque constant;

$L_w$ represents the spindle motor winding inductance; and $R_w$ represents the spindle motor winding resistance.

In one embodiment, the maximum phase current allowed to flow through the windings is limited to Imax (e.g., to prevent damage to the windings). Since the phase voltage is equal to the input voltage (Vin) minus the BEMF voltage, the phase voltage and phase current are maximum during the beginning of the spin-up operation when the BEMF voltage is at a minimum. At some point during the spin-up operation, the rotation speed of the spindle motor and corresponding BEMF voltage will reach a level where the current limit will no longer be reached. In one embodiment, the maximum sinusoidal driving voltage of the spindle motor may also be limited (e.g., due to design constraints of the control circuitry). In the embodiments of the present invention, the lead angle and resulting torque is optimized in view of these design limitations.

In one embodiment, during the beginning of the spin-up operation the control circuitry is capable of generating the sinusoidal driving voltage with sufficient magnitude to maximize the torque, and therefore the maximum torque is limited by the phase current limit Imax. Assuming that the phase current will reach the limit Imax during the beginning of the spin-up operation, the torque is maximized by maximizing the real part of the phase current:

$$\text{real}(\vec{I}_{ph}) = |\vec{I}_{ph}| \cos \theta \leq I_{max}$$

where θ is the lag angle of the phase current. According to the above equation, the torque reaches a maximum when θ=0 (when the phase current vector is aligned with the BEMF voltage in FIG. 5). When θ=0, the corresponding lead angle is represented as:

$$\arctan\left(\frac{\omega_e L_w \times I_{max}}{K_e \omega + R_w \times I_{max}}\right). \quad \text{equation (1)}$$

Therefore, in one embodiment the control circuitry adjusts the sinusoidal driving voltage so that the lead angle substantially tracks equation (1) during the beginning of the spin-up operation.

At some point during the spin-up operation, the lead angle will not be able to satisfy the above equation (1) because the rotation speed and resulting BEMF voltage will cause the input voltage Vin to exceed the voltage limit Vmax. That is, the only way the lead angle could satisfy equation (1) is if the input voltage Vin could exceed the voltage limit Vmax which in one embodiment is not possible. According to the above equation (1), the input voltage Vin will reach the voltage limit Vmax when:

$$V_{in} = \sqrt{(K_e \omega + R_w I_{max})^2 + (\omega_e L_w)^2} \quad \text{equation (2).}$$

In one embodiment, the input voltage Vin is adjusted so that the lead angle satisfies equation (1) up to the point that the input voltage Vin will exceed equation (2).

Assuming that the input voltage Vin has reached the voltage limit Vmax, the corresponding phase current can be computed as:

$$\vec{I}_{ph} = \frac{|\vec{V}_{in}|\cos\alpha - V_{bemf} + j \cdot |\vec{V}_{in}|\sin\alpha}{R_w + j \cdot \omega_e L_w}$$

and the corresponding torque can be computed as:

$$T_d = \text{real}\left(\frac{|\vec{V}_{in}|\cos\alpha - V_{bemf} + j \cdot |\vec{V}_{in}|\sin\alpha}{R_w + j \cdot \omega_e L_w}\right) \times K_t$$

$$= \frac{|\vec{V}_{in}| \cdot R_w \cdot \cos\alpha - R_w \cdot V_{bemf} + \omega_e L_w \cdot |\vec{V}_{in}|\sin\alpha}{R_w^2 + (\omega_e L_w)^2}$$

The corresponding torque will reach a maximum when:

$$\frac{dT_d}{d\alpha} = 0$$

or when:

$$\frac{dT_d}{d\alpha} = \frac{-|\vec{V}_{in}| \cdot R_w \cdot \sin\alpha + \omega_e L_w \cdot |\vec{V}_{in}|\cos\alpha}{R_w^2 + (\omega_e L_w)^2} = 0$$

which means:

$$-|\vec{V}_{in}| \cdot R_w \cdot \sin\alpha + \omega_e L_w \cdot |\vec{V}_{in}|\cos\alpha = 0$$

which is satisfied when:

$$R_w \cdot \sin\alpha = \omega_e L_w \cdot \cos\alpha.$$

Therefore, assuming that the input voltage Vin has reached the voltage limit Vmax, the torque is optimized when the lead angle satisfies the equation:

$$\arctan\left(\frac{\omega_e L_w}{R_w}\right). \quad \text{equation (3)}$$

Equation (3) assumes the phase current will not reach the current limit Imax. However, there may be an interval during the spin-up operation wherein the input voltage Vin will reach the voltage limit Vmax and the phase current will reach the current limit Imax. Therefore, an equation is needed to optimize the lead angle when both the input voltage Vin and the phase current have reached their limit. Assuming that the phase current reaches the current limit Imax, then:

$$|\vec{I}_{ph}| = \frac{|\vec{V}_{ph}|}{|R_w + j\omega_e L_w|} = I_{max}$$

Also assuming:

$$|\vec{V}_{in}| = V_{max}$$

then:

$$|\vec{V}_{ph}|^2=|\vec{V}_{in}|^2+|\vec{V}_{bemf}|^2-2\cdot|\vec{V}_{in}|\cdot|\vec{V}_{bemf}|\cdot\cos\alpha$$

and therefore:

$$\alpha = \arccos\left(\frac{|\vec{V}_{in}|^2 + |\vec{V}_{bemf}|^2 - |\vec{V}_{ph}|^2}{2\cdot|\vec{V}_{in}|\cdot|\vec{V}_{bemf}|}\right)$$

$$= \arccos\left(\frac{|\vec{V}_{in}|^2 + |\vec{V}_{bemf}|^2 - |\vec{I}_{ph}|^2\cdot|R_w + j\omega_e L_w|^2}{2\cdot|\vec{V}_{in}|\cdot|\vec{V}_{bemf}|}\right)$$

or equivalently:

$$\arccos\left(\frac{V_{max}^2 + (K_e\omega)^2 - I_{max}^2[R_w^2 + (\omega_e L_w)^2]}{2\times V_{max}\times K_e\omega}\right). \quad \text{equation (4)}$$

Figure 6A:
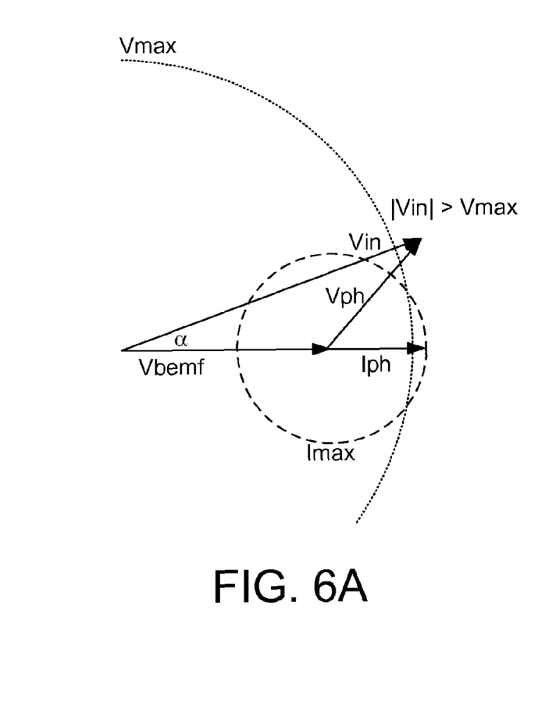
FIG. 6A illustrates a lead angle wherein the spindle motor sinusoidal driving voltage exceeds a specified limit according to an embodiment of the present invention.
Figure 6B:
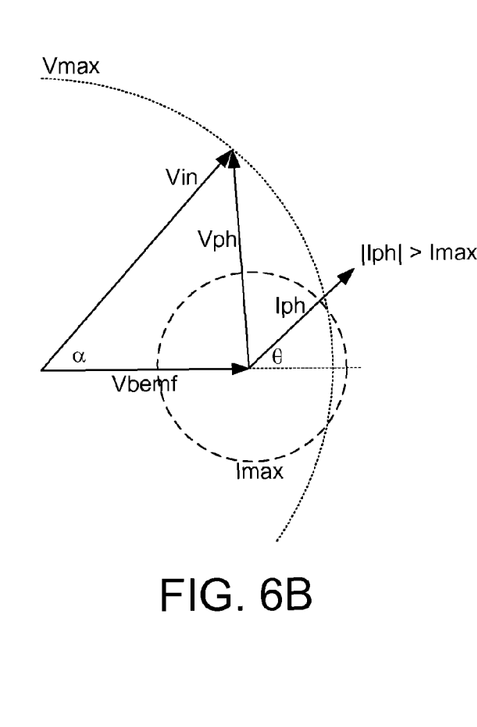
FIG. 6B illustrates a lead angle wherein the spindle motor phase current exceeds a specified limit according to an embodiment of the present invention.
Figure 6C:
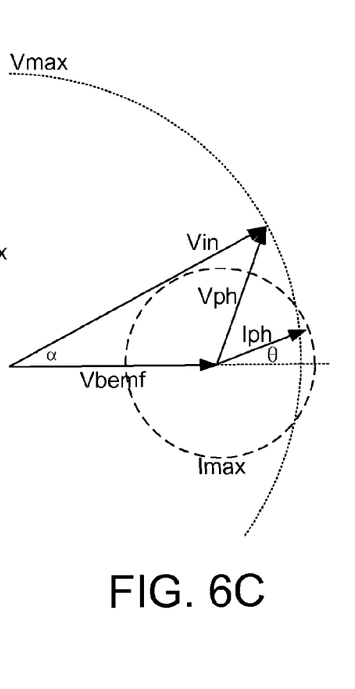
FIG. 6C illustrates a lead angle wherein the spindle motor sinusoidal driving voltage and phase current are both within the specified limits according to an embodiment of the present invention.

FIG. 6A illustrates the condition where if the lead angle is computed according to equation (1), the input voltage Vin will eventually exceed the voltage limit Vmax. FIG. 6B illustrates the condition where if the lead angle is computed according to equation (3), the phase current may exceed the current limit Imax during at least part of the spin-up operation. FIG. 6C illustrates the lead angle computed according to equation (4) so that the input voltage Vin does not exceed the voltage limit Vmax and so that the phase current does not exceed the current limit Imax during this interval.

In one embodiment, during the beginning of the spin-up operation, the sinusoidal driving voltage (Vin) is adjusted so that the lead angle satisfies equation (1) up until Vin exceeds equation (2). When Vin will exceed equation (2), the sinusoidal driving voltage is adjusted so that the lead angle satisfies the lesser of equation (3) and equation (4). That is, the sinusoidal driving voltage is adjusted according to either equation (3) or equation (4), whichever equation generates the smaller lead angle.

Figure 7A:
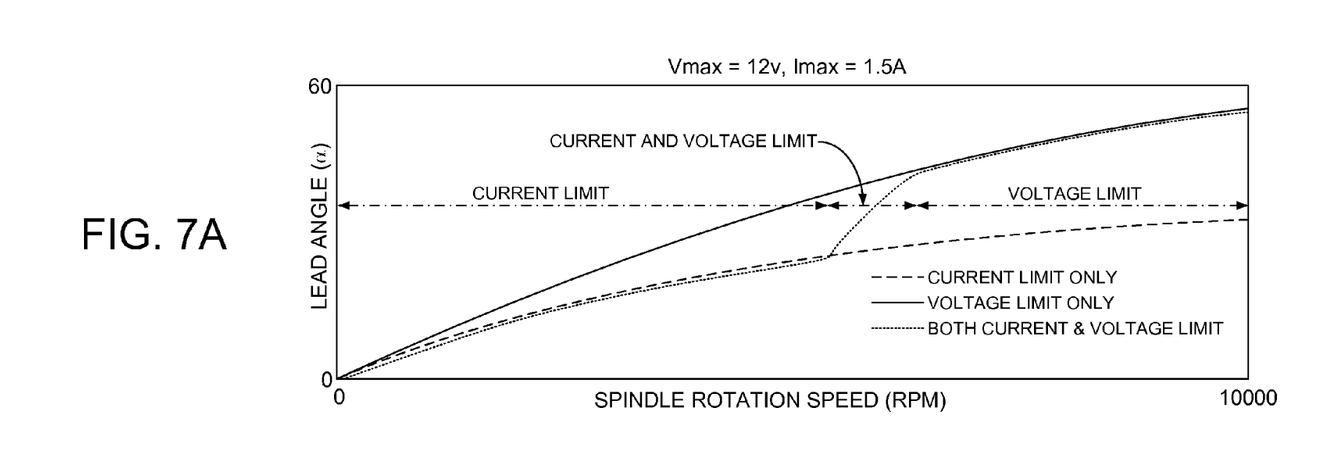
FIG. 7A illustrates an optimal lead angle relative to a rotation speed of the disk according to an embodiment of the present invention.
Figure 7B:
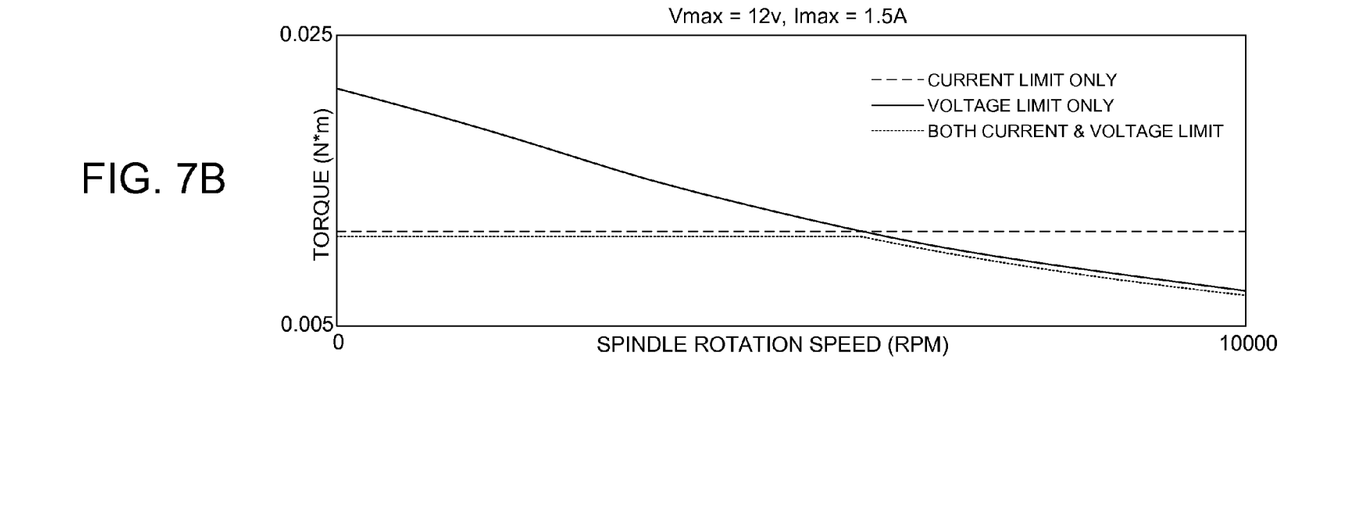
FIG. 7B illustrates a resulting optimal torque generated by the spindle motor when operating with the optimal lead angle according to an embodiment of the present invention.

FIG. 7A shows the optimal lead angle when the sinusoidal driving voltage is generated according to the above equations during the spin-up operation from zero speed to a maximum speed of 10,000 RPM. The optimal lead angle is shown when there is only a phase current limit, when there is only an input voltage limit, and when there is both a phase current limit and an input voltage limit. As shown in FIG. 7A, during a beginning interval of the spin-up operation, the phase current will reach the current limit, but the input voltage will not reach the voltage limit, and therefore the lead angle is computed according to equation (1). Eventually, the input voltage will reach the voltage limit when the rotation speed reaches a certain level, and for a middle interval of the spin-up operation both the phase current and the input voltage will be at their limits, and therefore the lead angle is computed according to equation (4). After the middle interval, the rotation speed will reach a point where the phase current will fall bellow the current limit since the BEMF voltage will begin to saturate the phase voltage. From the end of the middle interval until the end of the spin-up operation, the lead angle is computed according to equation (3). FIG. 7B shows the resulting torque corresponding to the lead angle of FIG. 7A, wherein in the example of FIGS. 7A and 7B Vmax=12 v and Imax=1.5 A.

Any suitable control circuitry 32 (FIG. 3) may be employed to generate the sinusoidal driving voltage applied to the windings of the spindle motor so as to optimize the lead angle and corresponding torque. In one embodiment, the sinusoidal driving voltages may be generated using linear amplifiers driven by a sine wave signal. In an alternative embodiment shown in FIG. 3, the control circuitry 32 comprises a plurality of switches 44 that are pulse width modulated by a sine wave in order to generate the sinusoidal driving voltages applied to the windings of the spindle motor 30. A BEMF detector 48 detects zero crossings in the BEMF voltage generated by the open winding to generate a square wave 50 similar to FIG. 2. The commutation controller 52 also applies a control signal 56 to the BEMF detector 48 to signal the open winding from which the BEMF voltage can be reliably measured.

In one embodiment, the commutation controller 52 compares the zero crossings in the square wave 50 to the corresponding zero crossings in the sinusoidal driving voltages in order to take discrete measurements of the lead angle. The commutation controller 52 subtracts the measured lead angle from a target lead angle computed from the above-described equations, and the resulting error filtered using a suitable closed-loop compensation filter to generate the control signal 54. The control signal 54 adjusts the sinusoidal driving voltages so as to drive the closed-loop error toward zero. In an alternative embodiment, the commutation controller 52 may adjust the sinusoidal driving voltages open loop in response to the measured rotation speed of the spindle motor so that the lead angle tracks the above-described equations using an open loop control system (i.e., without measuring the actual lead angle during the spin-up operation).

In the embodiment of FIG. 3, the commutation controller 52 measures the rotation speed of the spindle motor 30 by evaluating the frequency of the square wave 50 representing the BEMF zero crossings. However, any other suitable technique may be employed to measure the rotation speed of the spindle motor, such as any suitable inductive sense, mutual inductance, or encoder technique wherein the position of the rotor is estimated relative to the stator (the speed being the change in position over time).

The sinusoidal driving voltages for driving the windings of the spindle motor may be generated using any suitable technique, including equations that compute a sine wave in real-time, or with a lookup table storing discrete values of a sine wave. In other embodiments, the sinusoidal driving voltages may be generated by estimating a sine wave, such as with a trapezoidal wave or even a square wave.

Any suitable control circuitry may be employed in the embodiments of the present invention, such as any suitable integrated circuit or circuits (e.g., an application specific integrated circuit (ASIC)) for implementing the commutation logic 46 and commutation controller 52. In one embodiment, the control circuitry comprises a microprocessor operable to execute the steps of a control program stored on any suitable computer readable medium (e.g., a disk or semiconductor memory). In addition, the control circuitry may comprise any suitable circuitry for processing signals in the analog domain and/or in the digital domain (e.g., suitable analog and/or digital circuitry for processing the BEMF voltage to measure the lead angle).

What is claimed is:

1. A disk drive comprising:
    a disk;
    a head actuated over the disk;
    a spindle motor for rotating the disk, the spindle motor comprising a plurality of windings; and
    control circuitry operable to spin-up the disk by:
        applying a sinusoidal driving voltage to each winding of the spindle motor;

measuring a back electromotive force (BEMF) voltage generated by at least one of the windings;

measuring a rotation speed of the spindle motor; and adjusting the sinusoidal driving voltage in order to optimize a lead angle relative to the rotation speed and a target maximum current applied to at least one of the windings, wherein the lead angle represents a degree the sinusoidal driving voltage leads the BEMF voltage, wherein the control circuitry is operable to adjust the sinusoidal driving voltage so that the lead angle is approximately equal to:

$$\arctan\left(\frac{\omega_e L_w \times I_{max}}{K_e \omega + R_w \times I_{max}}\right)$$

where:
$\omega$ represents the rotation speed of the spindle motor;
$\omega_e$ represents an electrical rotation speed of the spindle motor;
$I_{max}$ represents the maximum current;
$K_e$ represents a voltage constant of the spindle motor;
$L_w$ represents an inductance of at least one of the windings; and
$R_w$ represents a resistance of at least one of the windings.

2. The disk drive as recited in claim 1, wherein the control circuitry is operable to adjust the sinusoidal driving voltage so that the lead angle is approximately equal to:

$$\arctan\left(\frac{\omega_e L_w \times I_{max}}{K_e \omega + R_w \times I_{max}}\right)$$

when $$\sqrt{(K_e\omega+R_w I_{max})^2+(\omega_e L_w)^2} \le V_{max}$$

where $V_{max}$ represents a target maximum magnitude of the sinusoidal driving voltage.

3. The disk drive as recited in claim 2, wherein when $$\sqrt{(K_e\omega+R_w I_{max})^2+(\omega_e L_w)^2} > V_{max}$$

the control circuitry is operable to adjust the sinusoidal driving voltage so that the lead angle is approximately equal to the lesser of:

$$\arctan\left(\frac{\omega_e L_w}{R_w}\right)$$

and $$\arccos\left(\frac{V_{max}^2 + (K_e\omega)^2 - I_{max}^2[R_w^2 + (\omega_e L_w)^2]}{2 \times V_{max} \times K_e\omega}\right).$$

4. A method of operating a disk drive, the disk drive comprising a head actuated over a disk, and a spindle motor for rotating the disk, the spindle motor comprising a plurality of windings, the method comprising:

applying a sinusoidal driving voltage to each winding of the spindle motor;

measuring a back electromotive force (BEMF) voltage generated by at least one of the windings;

measuring a rotation speed of the spindle motor;

adjusting the sinusoidal driving voltage in order to optimize a lead angle relative to the rotation speed and a target maximum current applied to at least one of the windings, wherein the lead angle represents a degree the sinusoidal driving voltage leads the BEMF voltage; and adjusting the sinusoidal driving voltage so that the lead angle is approximately equal to:

$$\arctan\left(\frac{\omega_e L_w \times I_{max}}{K_e \omega + R_w \times I_{max}}\right)$$

where:
$\omega$ represents the rotation speed of the spindle motor;
$\omega_e$ represents an electrical rotation speed of the spindle motor;
$I_{max}$ represents the maximum current;
$K_e$ represents a voltage constant of the spindle motor;
$L_w$ represents an inductance of at least one of the windings; and
$R_w$ represents a resistance of at least one of the windings.

5. The method as recited in claim 4, further comprising adjusting the sinusoidal driving voltage so that the lead angle is approximately equal to:

$$\arctan\left(\frac{\omega_e L_w \times I_{max}}{K_e \omega + R_w \times I_{max}}\right)$$

when $$\sqrt{(K_e\omega+R_w I_{max})^2+(\omega_e L_w)^2} \le V_{max}$$

where $V_{max}$ represents a target maximum magnitude of the sinusoidal driving voltage.

6. The method as recited in claim 5, wherein when $$\sqrt{(K_e\omega+R_w I_{max})^2+(\omega_e L_w)^2} > V_{max}$$

further comprising adjusting the sinusoidal driving voltage so that the lead angle is approximately equal to the lesser of:

$$\arctan\left(\frac{\omega_e L_w}{R_w}\right)$$

and $$\arccos\left(\frac{V_{max}^2 + (K_e\omega)^2 - I_{max}^2[R_w^2 + (\omega_e L_w)^2]}{2 \times V_{max} \times K_e\omega}\right).$$

* * * * *